Oct. 10, 1961     E. P. WORTHEN ET AL     3,003,931
FOG-SCRUBBING ARRANGEMENT FOR FLASH DISTILLING PLANT
Filed Jan. 19, 1959     2 Sheets-Sheet 1
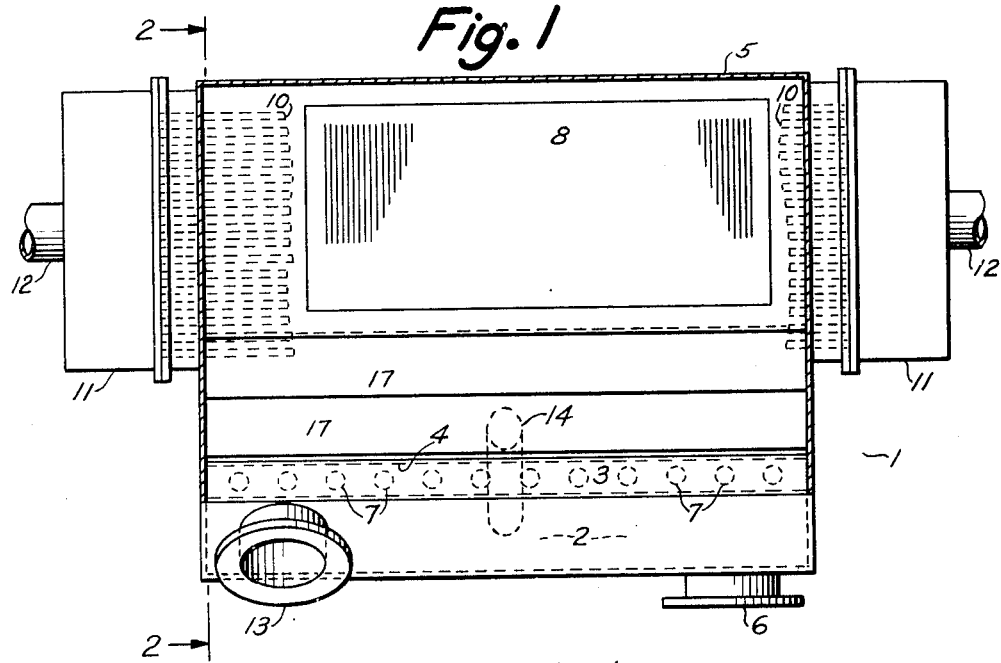
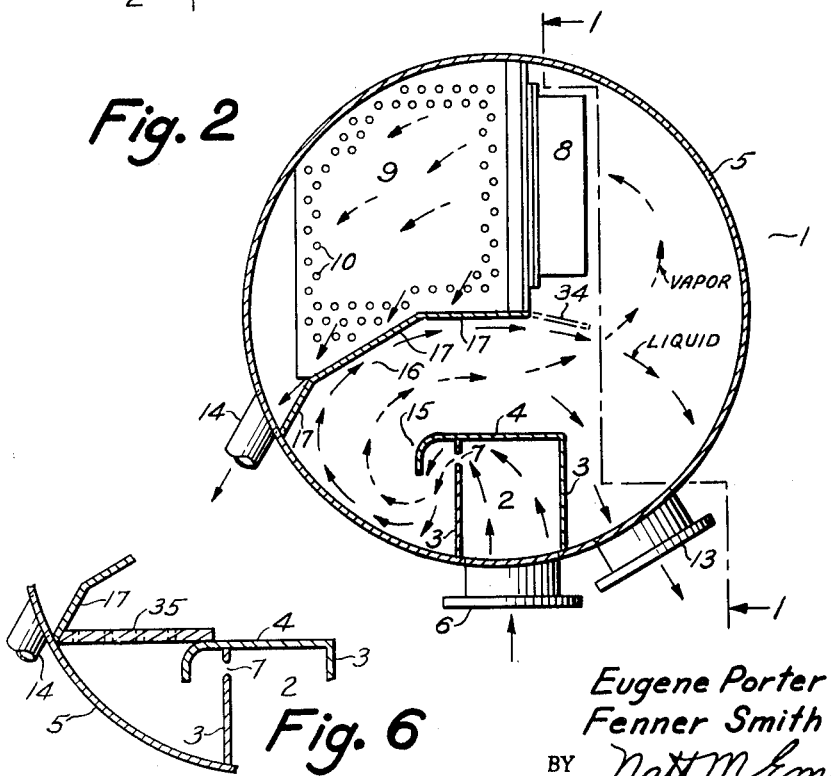
INVENTORS
Eugene Porter Worthen
Fenner Smith Barbour
BY Natt M Emery Jr.
ATTORNEY

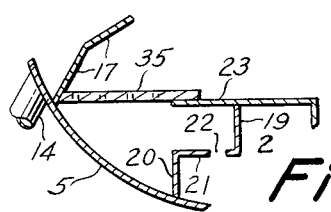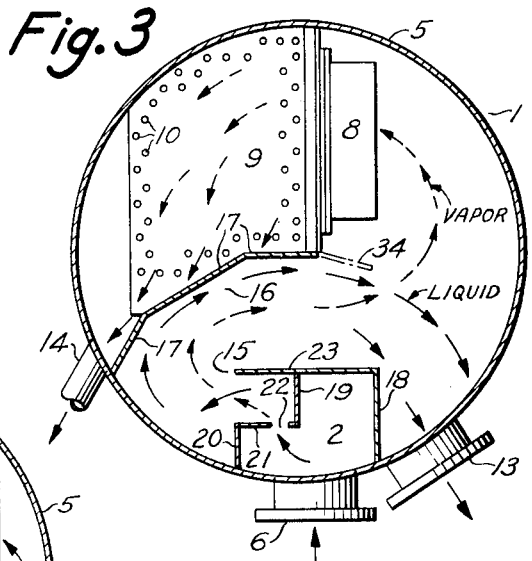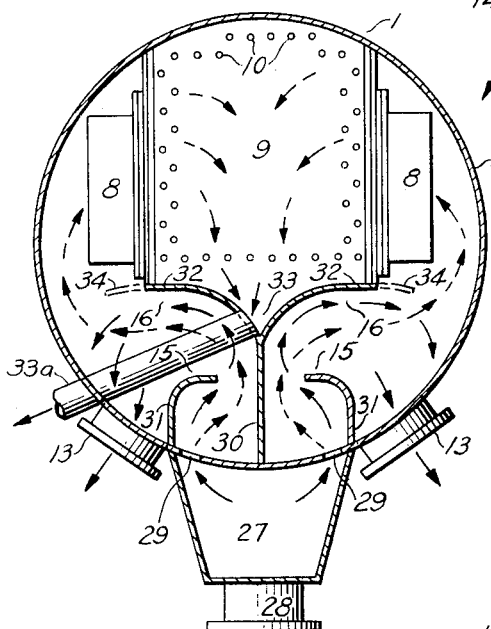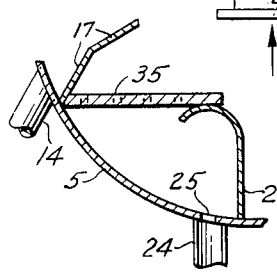
INVENTORS
Eugene Porter Worthen
Fenner Smith Barbour

United States Patent Office 3,003,931
Patented Oct. 10, 1961

3,003,931
FOG-SCRUBBING ARRANGEMENT FOR FLASH DISTILLING PLANT
Eugene Porter Worthen, Braintree, and Fenner Smith Barbour, Wollaston, Mass., assignors to Bethlehem Steel Company, a corporation of Pennsylvania
Filed Jan. 19, 1959, Ser. No. 787,417
27 Claims. (Cl. 202—53)

This invention relates specifically to a fog scrubbing arrangement and method for flash distilling plants.

In flash distilling apparatus heretofore known, it is the practice to install a vapor separator before the vapor condenser, to remove the entrained unflashed liquid from the vapor, thereby preventing contamination of the distillate. Experience has shown that vapor separators fail to function efficiently if extremely small droplets or fog reach them. We have invented an apparatus and method which efficiently removes the fog from the vapor, leaving to the vapor separator the function of removing the larger entrained droplets, thereby insuring a pure distillate.

Accordingly, it is one of the objects of this invention to provide an apparatus and method for scrubbing out the smaller entrained droplets or fog from the flashed vapor before the latter reaches the vapor separator.

It is another object of this invention to provide an apparatus and method for scrubbing out the smaller entrained droplets or fog from the flashed vapor, permitting only the larger liquid droplets to pass on to the vapor separator.

It is a further object of this invention to provide an apparatus and method whereby curtain-like sprays of unflashed liquids are formed, through which the vapor must pass before reaching the vapor separator, and in passing through said curtain-like sprays of unflashed liquid the fog in the vapor is scrubbed out and removed.

It is still another object of this invention to provide an apparatus and method whereby curtain-like sprays of unflashed liquid are formed, the vapor passing through one curtain-like spray of liquid, then undergoing a reversal or change of direction, and then passing through another curtain-like spray of liquid before reaching the vapor separator.

Other and further objects of this invention will become apparent during the course of the following description, reference being made to the accompanying drawings in which like numerals represent like parts in the several views:

FIGURE 1 represents an elevation, partly in view and partly in section, taken along the line 1—1 of FIG. 2, showing a typical flash evaporator or distilling plant in which this invention may be practiced. It will be understood that this invention is not limited to the exact construction of flash evaporator indicated in FIG. 1.

FIGURE 2 represents a section in elevation, taken along the line 2—2 of FIG. 1, showing the disposition of the deflecting plates in the typical flash evaporator, and the curtain-like sprays of unflashed liquid provided thereby, the liquid paths being generally indicated by the arrows with solid shafts, and the vapor paths being generally indicated by the arrows with broken or dashed shafts.

FIGURE 3 represents a modification of our invention, taken from the same aspect as FIGURE 2.

FIGURE 4 represents another modification of our invention, taken from the same aspect as FIGURE 2.

FIGURE 5 represents yet another modification of our invention, taken from the same aspect as FIGURE 2.

FIGURES 6, 7, 8 and 9 represent a modification of the apparatus of FIGURES 2, 3, 4 and 5, respectively.

Flash evaporator 1 is seen to comprise hot or superheated liquid feed duct 2, formed with side walls 3 and top plate 4, extending along the inside bottom of flash evaporator shell 5 from one end thereof to the other, and provided with inlet 6 and with orifices 7 spaced along one of said walls 3. The vapor separator and vapor condenser are indicated generally by the numerals 8 and 9 respectively. Tubes 10 of the vapor condenser 9 communicate with heads 11, coolant entering and leaving these heads 11 through lines 12. The unflashed liquid outlet is indicated by the numeral 13, and the distillate or condensate outlet is indicated by the numeral 14. It will be understood that the interior of the flash evaporator 1 may be evacuated by conventional means such as an ejector (not shown).

First or primary deflecting means, indicated generally by the numeral 15, are provided adjacent to and coextensive with duct 2, preferably extending below orifices 7. In the preferred embodiment of our invention, this may be done by extending and curving top plate 4 as best shown in FIG. 2. Of course, a separate plate, inclined or curved, may be installed, instead of the continuous top plate 4.

Second deflecting means, indicated generally by the numeral 16, and secured to the shell of flash evaporator 1 are provided as shown in FIG. 2, extending from one end of flash evaporator 1 to the other end thereof and comprising several flat plates 17. It will be understood that such means 16 may be provided, if desired, by a single or several curved plates. It will be observed that the second deflecting means 16 cooperates with that portion of the shell of flash evaporator 1 secured to said second deflecting means 16 and extending toward the first deflecting means 15 and feed duct 2, so that a substantially curved boundary is described thereby.

The operation of this device is as follows:

Heated liquid feed enters through inlet 6 into duct 2 and flashes through orifices 7. The mixture of flashed vapor and unflashed liquid feed impinges on the first deflecting means 15. This produces a curtain-like spray of liquid feed, extending from one end of the flash evaporator 1 to the other end thereof, through which the flashed vapor must pass and, in so doing, loses some of the entrained fog. The mixture then passes through an arc-like non-tortuous or non-zigzag-like path along the substantially curved boundary above described, undergoing a change, or reversal, of direction, the second deflecting means 16 forming another curtain-like spray of unflashed feed through which the vapor must pass before reaching the vapor separator 8. In passing through the second curtain-like spray of liquid, the remainder, or substantial part thereof, of the very fine droplets or fog of unflashed feed are scrubbed out of the vapor.

The vapor, now containing substantially only large droplets of liquid feed, enters the vapor separator 8 where the rest of the entrained liquid is removed, and then passes to the vapor condenser 9. Condensate collected through outlet 14. Unflashed liquid collec on one side of duct 2, as shown in FIG. 2, and is with drawn through outlet 13.

In the modification of our invention shown in FIG. feed duct 2 is seen to comprise wall 18, vertical plat 19 and 20, horizontal plate 21 provided with lengthwi spaced orifices 22, and top plate 23. In this arrangemer the flat top plate 23 functions as first or primary deflec ing means 15, the curved element of the top plate 4 of tl FIG. 2 embodiment having been eliminated.

In the modification of our invention shown in FIG. hot or superheated feed is introduced into the apparat through lengthwise spaced pipes 24 and lengthwise spac orifices 25, only one of said pipes 24 and orifices 25 bei shown in the figure, and flashes therein, the mixture flashed vapor and unflashed feed impinging on curv plate 26, the latter being coextensive with the length flash evaporator 1 and constituting the first or prima deflecting means 15. Instead of a number of lengthwise spaced pipes 24, a single manifold coextensive with the length of flash evaporator 1 can be used to introduce the heated feed to the lengthwise spaced orifices 25.

In the modification of our invention shown in FIGURE 5, we combine in one shell 5 two flashing zones and two sets of deflecting means. Thus, feed duct 27, provided with inlet 28, introduces hot or superheated feed through lengthwise spaced orifices 29 into flash evaporator 1 on either side of wall 30. Curved walls 31 are provided as shown and constitute first or primary deflecting means 15. Wall 30 is provided with curved elements 32 and constitutes therewith two second deflecting means 16, each of said second deflecting means 16 cooperating with one of said primary deflecting means 15 to propagate a curtain-like spray of unflashed feed for the purpose of removing fog from the flashed vapor as heretofore described. Feed duct 27, walls 30 and 31, and element 32 are all coextensive with the length of flash evaporator 1. To accommodate the flashed vapor from the two flashing and fog scrubbing zones just described, we provide two vapor separators 8 on either side of vapor condenser 9. It will be noted that curved elements 32 define, adjacent their apex, distillate collecting pocket 33, and line 33a communicates therewith for the purpose of withdrawing distillate from flash evaporator 1.

If required, for more complete flow control of the unflashed liquid and the second curtain-like spray, it may be desired to extend the second deflecting means 16 beyond the forward edge of vapor separator 8 by means of plate 34, as shown in phantom in FIGS. 2, 3, 4 and 5.

When flash evaporator 1 is to be placed in marine service, particularly aboard a vessel traveling in heavy seas, it may be desirable to install perforated distributing plates 35 in the apparatus of FIGS. 2, 3, 4 and 5, as shown in FIGS. 6, 7, 8 and 9 respectively. Thus, when the vessel pitches or rolls, distributing plate 35 prevents all of the unflashed feed from going to one end of the apparatus, or at least reduces the rush of the unflashed feed to one end of the apparatus, which otherwise might result in a gap in the curtain-like spray of unflashed feed at the opposite end of the apparatus, through which gap the flashed vapor could pass without having the fog scrubbed therefrom.

Although we have shown the shell of flash evaporator 1 as having cylindrical configuration, it will be understood that our invention can be practiced with evaporator shells of other shapes.

We do not wish to be limited to the exact construction and operation shown and described, but may use such substitutions, modifications or equivalents thereof as are embraced within the scope of our invention, or as pointed out in the claims.

We claim:

1. In a flash evaporator, the combination comprising first means to distribute heated feed in said flash evaporator for flash evaporation therein, first deflecting means adjacent said first means to propagate a first curtain-like spray of unflashed feed, second deflecting means receiving the deflected unflashed feed from said first deflecting means to propagate a second curtain-like spray of unflashed feed, and continuous arc-like boundary means operatively interposed between said first deflecting means and said second deflecting means whereby said unflashed feed from said first deflecting means is passed to said second deflecting means in an arc-like path.

2. Apparatus as in claim 1, said first and second deflecting means being arranged relative to each other to propagate their respective curtain-like sprays of unflashed feed in substantially opposite directions.

3. In a flash evaporator of the type including a vapor separator, the combination comprising first means to distribute heated feed in said flash evaporator for flash evaporation therein, first deflecting means adjacent said first means to propagate a first curtain-like spray of unflashed feed, second deflecting means operatively interposed between said first deflecting means and said vapor separator to propagate a second curtain-like spray of unflashed feed, and continuous arc-like boundary means operatively interposed between said first deflecting means and said second deflecting means whereby said unflashed feed from said first deflecting means is passed to said second deflecting means in an arc-like path.

4. Apparatus as in claim 3, said first and second deflecting means being arranged relative to each other to propagate their respective curtain-like sprays of unflashed feed in substantially opposite directions.

5. In a flash evaporator including a shell and a vapor separator, the combination comprising a feed duct extending lengthwise of the flash evaporator, orifices spaced along a wall of said duct, a first deflecting plate arranged lengthwise in exteriorly spaced relation to said duct, a second deflecting plate between the vapor separator and said first deflecting plate arranged lengthwise of said flash evaporator, and an arc-like path for the passage of unflashed feed defined by said first and second deflecting plates and said shell.

6. Apparatus as in claim 5, said first deflecting plate at least partially covering said orifices.

7. In a flash evaporator, the combination comprising a feed duct extending lengthwise of the flash evaporator, orifices spaced along a wall of said duct, a first deflecting plate having a first edge and a second edge, the first edge being secured to said duct and the second edge extending lengthwise of said duct in exteriorly spaced relation thereto, said first deflecting plate providing a first path for the passage of unflashed feed and vapor and propagating a first curtain-like spray of unflashed feed, a second deflecting plate extending lengthwise of said flash evaporator and providing a second path for the passage of unflashed feed and vapor and propagating a second curtain-like spray of unflashed feed, and continuous arc-like boundary means operatively interposed between said first path and said second path whereby said unflashed feed from said first path is passed to said second path in an arc-like path.

8. Apparatus as in claim 7, said second edge of said first deflecting plate at least partially covering said orifices.

9. Apparatus as in claim 7, said first and second deflecting plates being arranged relative to each other to propagate their respective curtain-like sprays of unflashed feed in substantially opposite directions.

10. In a flash evaporator provided with a shell, the combination comprising first means to distribute heated feed in said flash evaporator for flash evaporation therein, first deflecting means adjacent said first means to propagate a first curtain-like spray of unflashed feed, and second deflecting means cooperating with a portion of said shell to describe a substantially curved boundary for the arc-like passage of unflashed feed from said first deflecting means to said second deflecting means, said second deflecting means propagating a second curtain-like spray of unflashed feed.

11. Apparatus as in claim 10, said first and second deflecting means being arranged relative to each other to propagate their respective curtain-like sprays of unflashed feed in substantially opposite directions.

12. In a flash evaporator provided with a shell and a vapor separator, the combination comprising first means to distribute heated feed in said flash evaporator for flash evaporation therein, first deflecting means adjacent said first means to propagate a first curtain-like spray of unflashed feed, and second deflecting means secured to said shell and operatively interposed between said first deflecting means and said vapor separator to propagate a second curtain-like spray of unflashed feed, said second deflecting means cooperating with a portion of adjacent shell to describe a substantially curved boundary for the arc-like passage of unflashed feed from said first deflecting means to said second deflecting means.

13. Apparatus as in claim 12, said first and second deflecting means being arranged relative to each other to propagate their respective curtain-like sprays of unflashed feed in substantially opposite directions.

14. In a flash evaporator comprising a shell, the combination comprising a feed duct extending lengthwise of the flash evaporator, orifices spaced along a wall of said duct, a first deflecting plate arranged lengthwise in exteriorly spaced relation to said duct, and a second deflecting plate secured along one edge of said shell, said second deflecting plate and the portion of said shell extending from said second deflecting plate towards said first deflecting plate describing a substantially curved boundary for the arc-like passage of unflashed feed from said first deflecting plate to said second deflecting plate.

15. A method of scrubbing fog from the vapor produced by the flash evaporation of superheated feed, comprising flashing superheated feed to produce a mixture of vapor and unflashed feed, propagating a first curtain-like spray of unflashed feed, passing said vapor thorough said first curtain-like spray of unflashed feed, passing unflashed feed from said first curtain-like spray along an arc-like path and propagating a second curtain-like spray of unflashed feed, and passing said vapor through said second curtain-like spray of unflashed feed.

16. A method of scrubbing fog from the vapor produced by the flash evaporation of superheated feed, comprising flashing superheated feed to produce a mixture of vapor and unflashed feed, propagating a first curtain-like spray of unflashed feed, passing said vapor through said first curtain like spray of unflashed feed, passing unflashed feed from said first curtain-like spray and vapor along an arc-like path thereby substantially changing the direction of said vapor and unflashed feed, propagating a second curtain-like spray of unflashed feed, and passing said vapor through said second curtain-like spray of unflashed feed.

17. A method of scrubbing fog from the vapor produced by the flash evaporation of superheated feed, comprising flashing superheated feed through a restricted area to produce a mixture of vapor and unflashed feed, propagating a first curtain-like spray of unflashed feed, passing said vapor through said curtain-like spray of unflashed feed, passing unflashed feed from said first curtain-like spray and vapor along an arc-like path thereby substantially reversing the direction of said vapor and unflashed feed, propagating a second curtain-like spray of unflashed feed, and passing said vapor through said second curtain-like spray of unflashed feed.

18. In a flash evaporator, the combination comprising first means to distribute heated feed in said flash evaporator for flash evaporation therein, first deflecting means adjacent said first means to propagate a first curtain-like spray of unflashed feed, second deflecting means receiving the deflected unflashed feed from said first deflecting means to propagate a second curtain-like spray of unflashed feed, and continuous boundary means operatively interposed between said first deflecting means and said second deflecting means and constraining the motion of said unflashed feed in its passage from said first deflecting means to said second deflecting means to other than a zigzag-like path.

19. Apparatus as in claim 18, said first and second deflecting means being arranged relative to each other to propagate their respective curtain-like sprays of unflashed feed in substantially opposite directions.

20. Apparatus as in claim 18, further including second distributing means operatively interposed between said first and second deflecting means to assure propagation of a second curtain-like spray of unflashed feed substantially coextensive with said flash evaporator.

21. In a flash evaporator of the type including a vapor separator, the combination comprising first means to distribute heated feed in said flash evaporator for flash evaporation therein, first deflecting means adjacent said first means to propagate a first curtain-like spray of unflashed feed, second deflecting means operatively interposed between said first deflecting means and said vapor separator to propagate a second curtain-like spray of unflashed feed, and continuous boundary means operatively interposed between said first deflecting means and said second deflecting means and constraining the motion of said unflashed feed in its passage from said first deflecting means to said second deflecting means to other than a zigzag-like path.

22. Apparatus as in claim 21, said first and second deflecting means being arranged relative to each other to propagate their respective curtain-like sprays of unflashed feed in substantially opposite directions.

23. Apparatus as in claim 21, further including second distributing means operatively interposed between said first and second deflecting means to assure propagation of a second curtain-like spray of unflashed feed substantially coextensive with said flash evaporator.

24. In a flash evaporator comprising a shell, the combination comprising a wall arranged internally of said shell and defining a first and a second zone, first and second means to distribute heated feed to said first and second zones respectively and arranged on opposite sides of said wall, first and second primary deflecting means adjacent said first and second means respectively to propagate first and second primary curtain-like sprays of unflashed feed in said first and second zones respectively, first and second secondary deflecting means receiving the unflashed feed from said first and second primary deflecting means respectively to propagate first and second secondary curtain-like sprays of unflashed feed in said first and second zones respectively, and continuous boundary means including said wall operatively interposed between said first and second primary deflecting means and said first and second secondary deflecting means and constraining the motion of said unflashed feed in its passage in the first zone between said first primary deflecting means and said first secondary deflecting means and in its passage in the second zone between said second primary deflecting means and said second secondary deflecting means to other than a zigzag-like path.

25. Apparatus as in claim 24, said first primary and secondary deflecting means being arranged relative to each other to propagate their respective curtain-like sprays of unflashed feed in substantially opposite directions and said second primary and secondary deflecting means being arranged relative to each other to propagate their respective curtain-like sprays of unflashed feed in substantially opposite directions.

26. Apparatus as in claim 24, further including first and second perforated plate distributing means operatively interposed in said first and second zones respectively between said primary and secondary deflecting means to assure propagation of first and second secondary curtain-like sprays of unflashed feed substantially coextensive with said flash evaporator.

27. Apparatus as in claim 24, further including a distillate collecting pocket defined by said first and second secondary deflecting means.

References Cited in the file of this patent

UNITED STATES PATENTS

| | | |
|---|---|---|
| 2,201,870 | Piercy et al. | May 21, 1940 |
| 2,274,801 | Mills | Mar. 3, 1942 |
| 2,274,802 | Mills | Mar. 3, 1942 |
| 2,613,177 | Worthen et al. | Oct. 7, 1952 |
| 2,934,477 | Siegfried | Apr. 26, 1960 |